United States Patent
Shiffer et al.

(10) Patent No.: US 9,690,935 B2
(45) Date of Patent: Jun. 27, 2017

(54) IDENTIFICATION OF OBFUSCATED COMPUTER ITEMS USING VISUAL ALGORITHMS

(71) Applicant: FireEye, Inc., Milpitas, CA (US)

(72) Inventors: Jason Shiffer, Vienna, VA (US); David Ross, Bowie, MD (US)

(73) Assignee: FireEye, Inc., Milpitas, CA (US)

(*) Notice: Subject to any disclaimer, the term of this patent is extended or adjusted under 35 U.S.C. 154(b) by 0 days.

(21) Appl. No.: 13/969,879

(22) Filed: Aug. 19, 2013

(65) Prior Publication Data

US 2014/0189866 A1    Jul. 3, 2014

Related U.S. Application Data

(60) Provisional application No. 61/747,752, filed on Dec. 31, 2012.

(51) Int. Cl.
| | | |
|---|---|---|
| *G06F 12/14* | (2006.01) | |
| *G06F 12/16* | (2006.01) | |
| *G06F 21/56* | (2013.01) | |
| *G06F 21/55* | (2013.01) | |

(52) U.S. Cl.
CPC ............ *G06F 21/562* (2013.01); *G06F 21/55* (2013.01); *G06F 21/561* (2013.01); *G06F 21/566* (2013.01)

(58) Field of Classification Search
None
See application file for complete search history.

(56) References Cited

U.S. PATENT DOCUMENTS

| | | | |
|---|---|---|---|
| 5,682,158 A | | 10/1997 | Edberg et al. |
| 5,832,270 A | * | 11/1998 | Laffra et al. .................. 717/125 |
| 7,739,740 B1 | * | 6/2010 | Nachenberg ......... G06F 21/566 709/206 |
| 7,930,752 B2 | * | 4/2011 | Hertzog et al. ................ 726/25 |
| 2002/0101996 A1 | * | 8/2002 | Takada .................... H04L 9/065 380/277 |
| 2005/0120239 A1 | * | 6/2005 | Monroe et al. ............... 713/201 |
| 2006/0129523 A1 | * | 6/2006 | Roman et al. .................... 707/1 |
| 2008/0065639 A1 | | 3/2008 | Choudhary et al. |
| 2009/0129590 A1 | * | 5/2009 | Konuma ......................... 380/44 |
| 2009/0238474 A1 | * | 9/2009 | Sandberg ............... G06K 9/723 382/229 |
| 2010/0180344 A1 | * | 7/2010 | Malyshev et al. ............. 726/23 |

(Continued)

FOREIGN PATENT DOCUMENTS

WO    WO2013079907 A1 *    6/2013    ............. G06F 17/22

OTHER PUBLICATIONS

International Search Report corresponding to PCT/US2014/012513 dated May 12, 2014.

*Primary Examiner* — Fatoumata Traore
(74) *Attorney, Agent, or Firm* — Rutan & Tucker, LLP

(57) ABSTRACT

A method to identify character strings associated with potentially malicious software items. The method includes employing a visual algorithm to translate one or more characters of a character string into corresponding characters in a visual ID for use in grouping and comparing computer items having similar visual IDs, such as a reference ID for a computer item that is known to be non-malicious. The method may, among other things, elucidate an attacker's attempt to obfuscate malicious software by using file names that are very similar to those used for harmless files.

18 Claims, 1 Drawing Sheet

(56) References Cited

U.S. PATENT DOCUMENTS

| | | | |
|---|---|---|---|
| 2010/0266215 A1* | 10/2010 | Hua | G06K 9/62 |
| | | | 382/229 |
| 2011/0154495 A1 | 6/2011 | Stranne | |
| 2012/0079596 A1* | 3/2012 | Thomas | G06F 21/55 |
| | | | 726/24 |
| 2012/0130983 A1 | 5/2012 | Ryan et al. | |

* cited by examiner

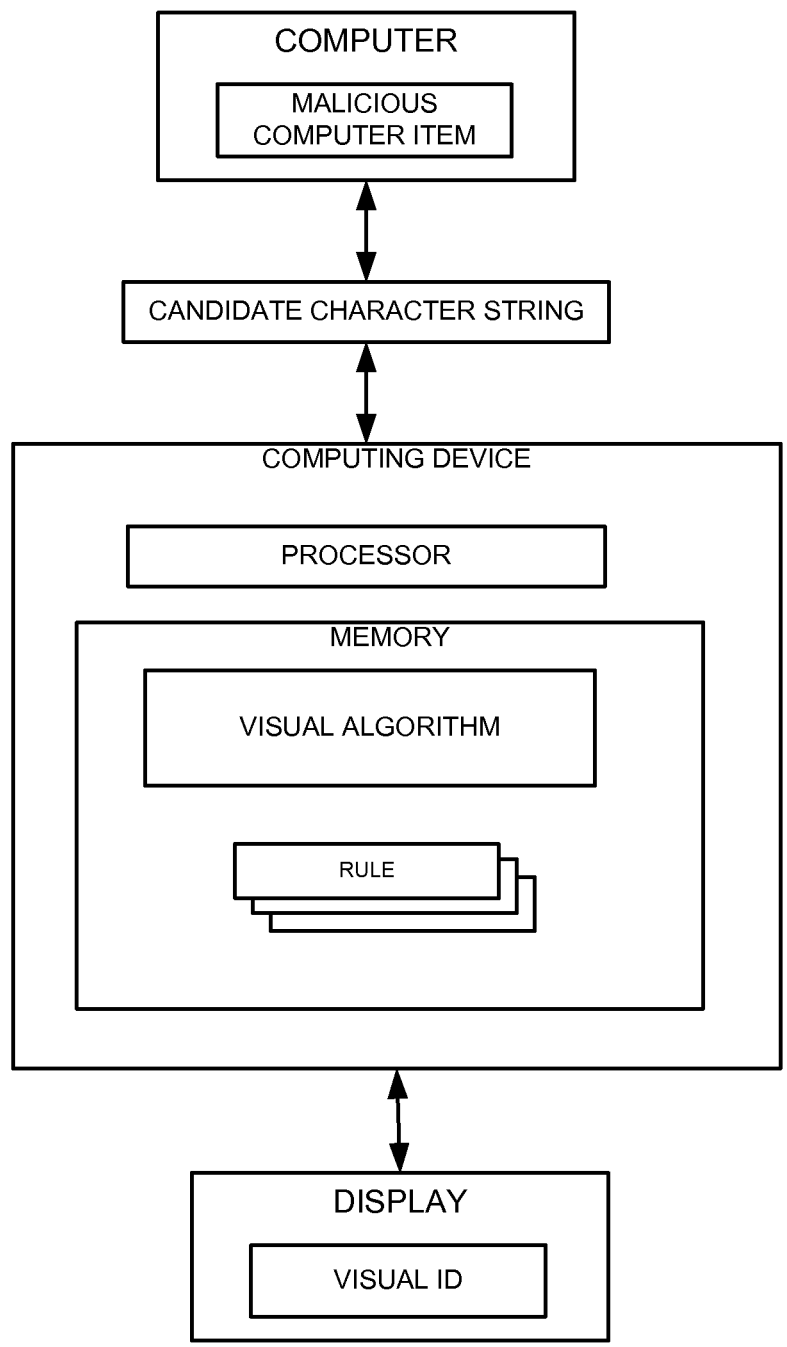

IDENTIFICATION OF OBFUSCATED COMPUTER ITEMS USING VISUAL ALGORITHMS

CROSS-REFERENCE TO RELATED APPLICATION

This Patent Application claims priority to U.S. Patent Application Ser. No. 61/747,752 filed Dec. 31, 2012, and titled Identification Of Obfuscated Computer Items Using Visual Algorithms, the entire contents of which is incorporated herein by reference in its entirety.

BACKGROUND

1. Field

The present inventive concept pertains to a system and method of conducting a forensic investigation on a computer system to identify potentially malicious computer items. The present inventive concept more particularly concerns an improved system and method for locating character strings potentially associated with malicious computer items.

2. Discussion of Related Art

As more businesses and governmental entities increasingly rely on computer networks to conduct their operations and store relevant data, security of these networks has become increasingly important. The need for increased security is emphasized when these networks are connected to non-secure networks such as the Internet. The preservation of important data and the ability to retrieve and analyze the data has become a major focus of forensic investigators.

Various technologies may be employed to aid in the processing and organizing of data, including search technologies, software that copies the entire contents of the hard drive in a computer system, and software that allows an analyst to review its contents and categorize it based on their observations. A computer attacker, for example, someone that seeks to introduce malicious software into a computer system and/or extract information from the computer system without authorization, may introduce files or other computer items onto a computer system that contain or are associated with character strings. The character strings are accessible or visible to users and investigators and, for example, may serve an identifying function such as by serving as a file name or subject line, or otherwise providing information about the computer items. As such, investigators may seek to identify malicious software or files by first identifying their character strings from amongst innocuous character strings occurring in the computer system.

Existing technologies for detecting such character strings include "rack and stack" frequency analysis mechanisms and/or attempts to identify explicit misspellings in the character strings. These technologies are to some extent unreliable or sluggish given their dependency on external information and contextual information available from other systems, or are otherwise flawed in their ability to accurately identify character strings more likely to be associated with malicious software.

Accordingly, there exists a need for additional technologies to improve location of character strings potentially associated with malicious computer items.

SUMMARY

The present inventive concept described herein remedies the aforementioned problems by providing a unique method and system to locate character strings associated with potentially malicious computer items.

In accordance with an aspect of the present inventive concept, a method is presented for identifying a character string associated with a potentially malicious computer item including the steps of initiating a visual algorithm on a computer, e.g., using a computer, and applying the visual algorithm to a candidate character string to generate a visual ID, e.g., using the computer. The visual ID is used to represent the candidate character string in a manner more useful to a forensic investigator, e.g., in a visual manner so that commonalities between one or more character strings contained in the computer may be easily identified.

The visual algorithm may be applied to the candidate character string, e.g., using a computer, to translate a first character of the candidate character string into a first character of the visual ID. The visual algorithm may call or include a first pre-determined rule for translating the first character and a second character of the candidate character string into corresponding first and second characters of the visual ID. In certain aspects of the present inventive concept, the first and second characters of the candidate character string may be different but be translated by the first pre-determined rule into identical corresponding first and second characters of the visual ID.

In an aspect of the present inventive concept, the visual algorithm may call or include a pre-determined rule that determines that one or more characters of the candidate character string will not be represented by a corresponding character in the visual ID. In a further aspect of the present inventive concept, the visual algorithm may apply a length limit for the visual ID, limiting the number of characters that will be included in the visual ID. In certain embodiments, additional neutral value characters will be added to fill out the visual ID such that it meets or exceeds the length limit.

In yet another aspect of the present inventive concept, the investigator compares the visual ID against a reference ID associated with a computer item to determine any differences between the two.

In a still further aspect of the present inventive concept, the candidate character string is associated with a computer item that has a characteristic the investigator believes may be relevant to the investigation, such as a file size, memory location, or similar characteristic. The investigator may determine a value for the characteristic, such as a file size, memory location, or other value, and compare the value against a value determined for that characteristic for the item associated with the reference ID. This may help further inform the analysis of whether the computer item associated with the candidate character string is more or less likely to be malicious.

Additional aspects, advantages, and utilities of the present inventive concept will be set forth in part in the description which follows and, in part, will be obvious from the description, or may be learned by practice of the present inventive concept.

The foregoing is intended to be illustrative and is not meant in a limiting sense. Many features and subcombinations of the present inventive concept may be made and will be readily evident upon a study of the following specification. These features and subcombinations may be employed without reference to other features and subcombinations.

DESCRIPTION OF THE FIGURES

FIG. 1 illustrates an example system for identification of obfuscated computer items using visual algorithms.

DETAILED DESCRIPTION

The following detailed description illustrates the present inventive concept in view of FIG. 1. The description is intended to describe aspects of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to "one embodiment," "an embodiment," or "embodiments" mean that the feature or features being referred to are included in at least one aspect of the present inventive concept. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present inventive concept can include a variety of combinations and/or integrations of the embodiments described herein.

The software that executes the various operations of the present inventive concept may reside on many different hardware configurations which would be known to one skilled in the art and are generally referred to herein as a "computer" which is understood to have or have access to, at a minimum, a processor for running the software. The following describes a system and method for identifying character strings associated with potentially malicious computer items. In a method according to an aspect of the present inventive concept, a visual algorithm is initialized and applied to a candidate character string to generate a visual ID. The visual ID is used to represent the candidate character string in a manner more useful to a forensic investigator.

A computer item is a program, process, file, or similar construct containing data and/or computer instructions. The visual algorithm is a set of executable computer instructions for processing or consuming a character string and generating a corresponding visual ID based on the character string, according to one or more logical rules. A character string includes two or more discrete symbols or "characters" appearing together such that a user or investigator may access and/or view them and discern a relationship between the two (for example, 'filename.exe' may be a filename character string in which "f" and "n" are both characters). The characters may be alphanumeric symbols such as letters in the alphabet of one or more languages (which may or may not be differentiated in aspects of the present inventive concept based upon capitalization) or numbers, or may be symbols used for punctuation, or other symbols recognized by a computer system. In a preferred embodiment, the character string is primarily alphanumeric and represents a filename-associated with a file computer item. However, it is anticipated that other forms of character strings may be used without departing from the spirit of the present inventive concept. It is also anticipated that a character string may be associated with a computer item in other ways, such as by simply having a relationship within computer memory or mapping with that computer item, without departing from the spirit of the present inventive concept. A candidate character string is one to which the visual algorithm is capable of application to create a corresponding visual ID.

A logical rule for translating a candidate character string may be set according to a pre-determined methodology determined by an investigator, by default, and/or by incorporating patterns gleaned from prior analyses performed on other character strings. Patterns from prior analyses may be identified by, for example, computing values for false positives and false negatives relating to identification of malicious computer items undertaken when employing a particular rule or set of rules. An example of a rule is a set of computer-implemented instructions to cause the visual algorithm to translate a number of visually-similar characters of a candidate character string into just one character, which is then used to form a visual ID. For example, the rule may cause each of the characters "a", "c", "e" and "r" appearing in a candidate character string to translate into the character "1" for inclusion in and formation of a corresponding visual ID.

A rule may also be configured so that two or more characters in the candidate character string that appear in succession may be translated into a single character for inclusion in the visual ID; for example, where "r" appears before "n" in a candidate character string, a rule may translate the pair into a single character (for example, the same character used in a visual ID to represent the letter "m") for inclusion in the visual ID. It is contemplated that such a rule may similarly operate to convert the two or more characters into one character in the candidate character string prior to translation into a visual ID (for example, if "r" and "n" are converted to "m" in the candidate character string prior to translation to a visual ID). Inversely, a rule may be configured to convert or translate two or more characters in the candidate character string into a fewer number of characters without departing from the spirit of the present inventive concept.

Still further, a rule may also be configured to translate a leading character in a candidate character string to the same character for inclusion in a visual ID. Such a rule may further be configured so that when the leading character is a capitalized letter of an alphabet the rule translates the character into the lower-case version of that alphabetic character for inclusion in the visual ID. Broadly speaking then, a rule may simply provide that a candidate character string character be translated by "passing it through" to the visual ID in substantially the same form as it appeared in the candidate character string, without departing from the spirit of the present inventive concept.

The visual algorithm may be applied to the candidate character string to translate a first character of the candidate character string into a corresponding first character of the visual ID. The visual algorithm may call or include a first pre-determined rule for translating the first character and a second character of the candidate character string into corresponding first and second characters of the visual ID. In certain aspects of the present inventive concept, the first and second characters of the candidate character string may be different but be translated by the first pre-determined rule into identical corresponding first and second characters of the visual ID.

In an aspect of the present inventive concept, the visual algorithm may call or include a pre-determined rule that determines that one or more characters of the candidate character string will not be represented by a corresponding character in the visual ID. In a further aspect of the present inventive concept, the visual algorithm may apply a length limit for the visual ID, limiting the number of characters that will be included in the visual ID. In certain embodiments, additional neutral value characters will be added to fill out the visual ID such that it meets or exceeds the length limit.

The length limit may be set according to a pre-determined methodology determined by an investigator, by default, and/or by determining efficiencies and accuracy rates enjoyed in prior analyses performed on other character strings. Such methodology gleaned from prior analyses may be determined by, for example, computing values for false positives and false negatives relating to identification of malicious computer items undertaken when employing particular length limit(s), and/or by computing the efficiency of investigation enjoyed in prior analyses when utilizing particular length limit(s). When a length limit is set, if a fully translated visual ID generated by the visual algorithm does not contain enough characters to meet the length limit, the visual algorithm may cause insertion of neutral value characters into the visual ID so that the visual ID meets or exceeds the length limit. A neutral value character may be a character of the visual ID that has no other meaning except as a "space filler", or may be chosen from amongst the visual ID characters that do have other meaning if it suits the goals of the investigator (for example, if a rule translates a variety of less-important characters from the candidate character string into the "0" character for inclusion in the visual ID to minimize their visual importance, the investigator may similarly choose to set the neutral value character to "0").

In yet another aspect of the present inventive concept, the investigator compares the visual ID against a reference ID associated with a computer item to determine any differences between the two. The reference ID, in a preferred embodiment, will be a visual ID translated by the visual algorithm according to the same rules under which the candidate character string was translated, but based on a character string from a computer item known not to be malicious. This sort of comparison allows a forensic investigator to better realize patterns and/or suspicious behavior. For example, an investigator may identify two computer items having the same visual ID, thus raising the possibility that one is malicious and merely emulating the character string of a non-malicious computer item.

In a still further aspect of the present inventive concept, the candidate character string is associated with a computer item that has a characteristic the investigator believes may be relevant to the investigation, such as a file size, memory location, or similar characteristic. The investigator may determine a value for the characteristic, such as a file size, memory location, or other value, and compare the value against a value determined for that characteristic for the computer item associated with the reference ID. This may help further inform the analysis of whether the computer item associated with the candidate character string is more or less likely to be malicious. For example, where a reference ID is used that corresponds to a non-malicious computer item with a file size expected to be within a certain range, and the visual ID of the candidate character string is associated with a computer item having a file size outside of said range, this may an indicator of the need to flag such computer item for further investigation.

An investigator may further view one or more aggregated visual IDs generated from a number of candidate character strings in a visual format on a visual display organized according to one or more organization models aimed at presenting the visual IDs in a manner more conducive to the investigation. For example, the investigator may view a timeline or log file on a visual display organized according to the date/time of occurrence of a series of events recorded for one or more computer items, where one or more of the computer items is represented by a visual ID. Such visual organization and representation may help the investigator to identify visual Ds more likely corresponding to malicious computer items. For example, where two computer items have the same or similar visual Ds and were executed at or near the same time in a computer system, it may be more likely that one of the computer items is malicious and simply emulating the non-malicious computer item.

Such a visual representation may further include an analysis of character strings as compared with visual IDs. For example, a candidate character string consisting of a filename for a computer item may have the same visual ID as that of a non-malicious computer item, but the filename may be different from the filename of the non-malicious computer item. If so, the visual representation may include the following or a similar comment in connection with the candidate character string's computer item: "Filename is not [filename for non-malicious computer item] but visual ID matches".

Such a visual representation may still further include the results of an analysis based on one or more characteristics of the computer items as described in more detail above. For example, if the visual IDs of two computer items are the same, and one of the computer items is known to be non-malicious and has a particular value for a characteristic such as file size, and the second computer item does not have the same value for the characteristic, the visual representation might report "The [candidate character string's computer item] has a similar visual ID as [non-malicious computer item] but is not [non-malicious computer item]".

The investigator may perform the present inventive concept using an agent in certain embodiments. An agent is a module of software installed on a target system that enables a user to monitor and interact with the target system. Agents allow users to gather information about multiple aspects of the target system. Agents also permit users to remotely retrieve the contents of the target system's memory or hard drive, and could potentially be configured to modify its contents. The agent may be configured to either communicate over a computer network, or to read and write all relevant configuration information and acquired data to a computer storage medium, such as a hard drive or removable read/write media (USB key, etc). In one embodiment, the agent is built in a modular fashion. The ability to gather a particular piece of data from a target system (e.g. a list of running processes on the target system or a log file or timeline) is implemented as a discrete module of software and loaded by the agent. This allows for easy adaptation of the agent to different environments that have specific requirements for data collection.

The previous description of the presently disclosed inventive concept is provided to enable any person skilled in the art to make or use the present inventive concept. Various modifications will be readily apparent to those skilled in the art, and the generic principles defined herein may be applied alternatively without departing from the spirit or scope of the present inventive concept. Thus, the present inventive concept is not intended to be limited to the description herein but is to be accorded the widest scope consistent with the principles and novel features disclosed herein.

The steps of a method, system, or operation described in connection with the present inventive concept disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Having now described the features, discoveries and principles of the present inventive aspect of this disclosure, the manner in which the present inventive aspect is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the present inventive aspect herein described, and all statements of the scope of the present inventive aspect which, as a matter of language, might be said to fall there between.

What is claimed is:

1. A method comprising:
   obtaining, by a visual algorithm stored in memory and executed by at least one processor of a first computer, a candidate character string associated with a potentially malicious computer item operating on a second computer;
   generating, by the visual algorithm during execution by the at least one processor, a first visual identifier (ID) by at least translating the candidate character string into the first visual ID in accordance with one or more translation rules stored on the first computer, the first visual ID is different from the candidate character string;
   generating a value representing a characteristic of the potentially malicious computer item, the characteristic being associated with a size of the potentially malicious computer item or a memory location associated with the potentially malicious computer item;
   analyzing the first virtual ID with a reference ID where a comparison between the first virtual ID and the reference ID is used to determine whether the potentially malicious computer item should be identified as a malicious computer item; and
   in response to the comparison between the first virtual ID and the reference ID being indeterminate as to whether the potentially malicious computer item is to be identified as a malicious computer item, further analyzing the characteristic of the potentially malicious computer item by determining whether the value falls outside an expected range of values associated with a non-malicious computer item.

2. The method of claim 1, wherein the generating of the first visual ID includes applying the visual algorithm to the candidate character string to translate a first character of the candidate character string into a first character of the first visual ID.

3. The method of claim 1, wherein the generating of the first visual ID includes using a first rule by the virtual algorithm to translate a first character and a second character of the candidate character string into corresponding first and second characters of the first visual ID.

4. The method of claim 3, wherein,
   the first and second characters of the candidate character string have different values, and
   the first rule is configured to control the virtual algorithm to translate the first and second characters of the candidate character string so that the first and second characters of the first visual ID are equal.

5. The method of claim 3, wherein the generating of the first visual ID by the visual algorithm during execution by the at least one processor further includes using a second rule to determine that a third character of the candidate character string will not be represented by a corresponding character in the first visual ID.

6. The method of claim 1, wherein the candidate character string is obtained over a network via an agent application operating on the second computer and the value representing the characteristic of the potentially malicious computer item is obtained through the agent application.

7. The method of claim 1, wherein the generating of the first visual ID further includes adding one or more neutral value characters to the first visual ID until the number of characters in the first visual ID is greater than or equal to a length limit established for the first virtual ID.

8. The method of claim 1, wherein the comparison of the first visual ID against the reference ID comprises
   determining a difference between the first visual ID and the reference.

9. The method of claim 1, wherein the generating of the value representing the characteristic of the potentially malicious computer item further comprising:
   determining the value for the characteristic of a first computer item associated with the candidate character string;
   determining a second value for a characteristic of a second computer item associated with a reference ID; and
   determining a difference between the value and the second value for the characteristic.

10. The method of claim 9, wherein the reference ID is chosen for comparison based on a visual similarity of the reference ID with the first visual ID.

11. The method of claim 1, further comprising:
    determining the expected range of values for the characteristic based on a second computer item associated with the reference ID; and
    flagging the first visual ID for further analysis if the value for the characteristic of the first computer item associated with the candidate character string does not satisfy the expected range of values.

12. The method of claim 1,
    displaying the first visual ID with a second visual ID on a visual display wherein,
    the first visual ID and the second visual IDs are arranged according to a timeline of computer events involving associated computer items under analysis by the visual algorithm being executed by the at least one processor.

13. The method of claim 1, further comprising:
    displaying the first visual ID with a second visual ID on a visual display; and
    displaying, via the visual display, comments for at least one of the first visual ID and the second visual ID that relate to at least one of (i) a comparison with a candidate character string, and (ii) a comparison with the value for the characteristic of the potentially malicious computer item.

14. The method of claim 1, wherein the translating the candidate character string comprises reducing a plurality of alphanumeric characters of the candidate character string to a single alphanumeric character of the visual ID.

15. The method of claim 14, wherein,
    the plurality of alphanumeric characters appear in the candidate character string in succession, and
    the single alphanumeric character is a numeral.

16. The method of claim 1, further comprising:
    converting a portion of the candidate character string prior to generating the first visual ID.

17. A system comprising:
    at least one processor;

a memory communicatively coupled to the at least one processor, the memory to store a visual algorithm that, when executed by the at least one processor, performs a plurality of operations that comprise:
   obtaining a candidate character string associated with a potentially malicious computer item from a computer,
   generating a first visual identifier (ID) by at least translating the candidate character string into the first visual ID, the first visual ID being different from the candidate character string,
   generating a value representing a characteristic of the potentially malicious computer item, the characteristic being associated with a size of the potentially malicious computer item or a memory location associated with the potentially malicious computer item,
   analyzing the first virtual ID with a reference ID where a comparison between the first virtual ID and a reference ID is used to determine whether the potentially malicious computer item should be identified as a malicious computer item, and
   in response to the comparison between the first virtual ID and the reference ID being indeterminate as to whether the potentially malicious computer item is to be identified as a malicious computer item, further analyzing the characteristic of the potentially malicious computer item by determining whether the value falls outside an expected range of values associated with a non-malicious computer item.

18. The system of claim 17, further comprising:
a visual display, wherein,
the visual algorithm, when executed by the at least one processor, is configured to display, via the visual display, the first visual ID with a second visual ID based on a timeline of computer events involving associated computer items.

* * * * *